United States Patent
Wortel et al.

(10) Patent No.: US 8,478,222 B2
(45) Date of Patent: Jul. 2, 2013

(54) I/Q CALIBRATION FOR WALKING-IF ARCHITECTURES

(75) Inventors: Klaas Wortel, Phoenix, AZ (US); Rainer Gaethke, San Francisco, CA (US); Vincent K. Jones, Redwood City, CA (US); James Gardner, San Ramon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 796 days.

(21) Appl. No.: 11/968,644

(22) Filed: Jan. 2, 2008

(65) Prior Publication Data
US 2008/0166985 A1 Jul. 10, 2008

Related U.S. Application Data

(60) Provisional application No. 60/883,736, filed on Jan. 5, 2007.

(51) Int. Cl.
*H04B 7/00* (2006.01)

(52) U.S. Cl.
USPC .... 455/233.1; 455/318; 455/63.1; 455/67.11; 455/324; 455/126; 375/329; 375/296

(58) Field of Classification Search
USPC .................. 455/233.1, 318, 63.1, 67.11, 324, 455/126; 375/329, 296
See application file for complete search history.

(56) References Cited

U.S. PATENT DOCUMENTS

| | | | |
|---|---|---|---|
| 5,371,481 A | | 12/1994 | Tiittanen et al. |
| 5,381,108 A | * | 1/1995 | Whitmarsh et al. ............ 330/2 |
| 5,675,287 A | * | 10/1997 | Baker et al. ................. 330/129 |
| 5,732,333 A | * | 3/1998 | Cox et al. .................... 455/126 |
| 5,864,586 A | | 1/1999 | Kato |
| 6,931,343 B2 | * | 8/2005 | Webster et al. ............. 702/107 |
| 7,133,657 B2 | * | 11/2006 | Kuenen et al. ............. 455/324 |
| 2002/0115416 A1 | | 8/2002 | Riou et al. |
| 2003/0223480 A1 | | 12/2003 | Cafarella |
| 2004/0066857 A1 | | 4/2004 | Srinivasan et al. |
| 2009/0054000 A1 | * | 2/2009 | Waheed et al. ............. 455/63.1 |

FOREIGN PATENT DOCUMENTS

| | | |
|---|---|---|
| EP | 1120944 | 8/2001 |
| JP | 9168038 A | 6/1997 |
| JP | 2004519888 T | 7/2004 |
| JP | 2006311056 | 11/2006 |
| WO | WO02067441 A2 | 8/2002 |

OTHER PUBLICATIONS

International Search Report and Written Opinion—PCT/US2008/050152, International Search Authority—European Patent Office—Nov. 7, 2008.
Taiwan Search Report—TW097100512—TIPO—Dec. 21, 2011.

* cited by examiner

*Primary Examiner* — Sanh Phu
(74) *Attorney, Agent, or Firm* — Howard Seo

(57) ABSTRACT

Systems and methodologies are described that facilitate calibration techniques for a station in a wireless communication system that can be utilized to provide joint estimates for distortion introduced by in-phase and quadrature (I/Q) imbalance and mixing-product modulated images.

29 Claims, 15 Drawing Sheets

I/Q CALIBRATION FOR WALKING-IF ARCHITECTURES

CROSS-REFERENCE

This application claims the benefit of priority from U.S. Provisional Patent Application Ser. No. 60/883,736, filed Jan. 5, 2007 and entitled "I/Q Calibration for Walking-IP Front-End Architectures," the entirety of which is incorporated herein by reference.

BACKGROUND

1. Field

The subject disclosure relates generally to wireless communications, and more specifically to calibration techniques for devices operating in a wireless communication system.

2. Background

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

As digital communication technology has advanced, users have come to expect faster throughputs in the face of harsher conditions. As a result, requirements for digital communication systems have become harder to implement. Likewise, newer systems typically require tighter controls and higher fidelity than that provided for previously released systems. To accomplish this, these systems implement features such as high fidelity in digital-to-analog conversion, frequency translation, amplification and the like. In addition, where components cannot be made so precisely as to not require it, calibration and correction circuits, methods, and processes are used to correct for inaccuracies and imprecision.

Some digital communication systems send data at radio frequencies ("RF") and have an I/Q (in-phase and quadrature) modulation and/or demodulation front-end. Gain and phase imbalances between the I and Q components of an I/Q modulator and demodulator in such a system can introduce in-band distortion. As a result, there is a need for calibration in such systems to reduce the effect of such imbalance.

SUMMARY

Certain embodiments provide techniques for calibrating I/Q transmitter circuits. The techniques generally include summing an in-phase (I) IF signal with a quadrature (Q) IF signal to generate a summed signal, mixing an RF local oscillator signal with the summed signal to generate an RF signal, wherein the RF signal has mixing-product modulated image components in a frequency band, detecting at least one parameter of the RF signal, and using the detected parameter to adjust at least one of the I and Q IF signals to reduce effects of both I/Q imbalance and the mixing-product modulated image components.

Certain embodiments provide a device that performs modulation for wireless communications. The device generally includes a component that sums an in-phase (I) IF signal with a quadrature (Q) IF signal to generate a summed signal, a component that mixes an RF local oscillator signal with the summed signal to generate an RF signal, wherein the RF signal has mixing-product modulated image components in a frequency band, a component that detects at least one parameter of the RF signal, and a component that uses the detected parameter to adjust at least one of the I and Q IF signals to reduce effects of both I/Q imbalance and the mixing-product modulated image components.

Certain embodiments provide an apparatus that performs modulation for wireless communications. The apparatus generally includes means for summing an in-phase (I) IF signal with a quadrature (Q) IF signal to generate a summed signal, means for mixing an RF local oscillator signal with the summed signal to generate an RF signal, wherein the RF signal has mixing-product modulated image components in a frequency band, means for detecting at least one parameter of the RF signal, and means for adjusting at least one of the I and Q IF signals, based on the detected parameter, to reduce effects of both I/Q imbalance and the mixing-product modulated image components.

Certain embodiments of the present invention provide a computer-program product for performing modulation for wireless communications, the computer-program product comprising a computer readable medium having instructions thereon. The instructions generally include code for detecting at least one parameter of an RF signal generated by summing an in-phase (I) IF signal with a quadrature (Q) IF signal to generate a summed signal and mixing an RF local oscillator signal with the summed signal to generate an RF signal, wherein the RF signal has mixing-product modulated image components in a frequency band, and code for adjusting at least one of the I and Q IF signals, based on the detected at least one parameter of the RF signal, to reduce effects of both I/Q imbalance and the mixing-product modulated image components.

Certain embodiments of the present invention provide a method, which at least includes selecting known in-phase (I) and quadrature (Q) IF signals to be transmitted in a known frequency band, summing the I IF signal with the Q IF signal to generate a summed IF signal, mixing an RF local oscillator signal with the summed IF signal to generate an RF signal, wherein the RF signal has mixing-product modulated image components in the known frequency band, and using a detected average power of the RF signal, adjust at least one of the I and Q IF signals to reduce effects of the mixing-product modulated image components.

Certain embodiments of the present invention provide a system, which at least includes means for selecting known in-phase (I) and quadrature (Q) IF signals to be transmitted in a known frequency band, means for summing the I IF signal with the Q IF signal to generate a summed IF signal, means for mixing an RF local oscillator signal with the summed IF signal to generate an RF signal, wherein the RF signal has mixing-product modulated image components in the known frequency band, and means for using a detected average power of the RF signal, adjust at least one of the I and Q IF signals to reduce effects of the mixing-product modulated image components.

DETAILED DESCRIPTION

Figure 1:
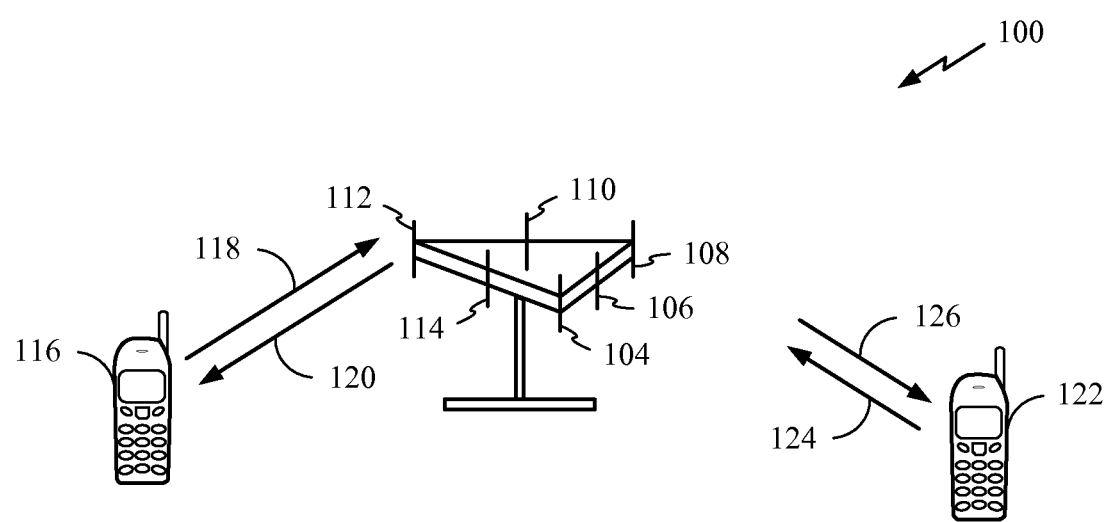
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may become evident, however, after learning the teachings herein, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

An Example System

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable terminology. In addition, an access terminal, e.g., an access terminal 116 or 122, can be a fixed or mobile station for communicating with access points and can be referred to as a mobile terminal, user equipment (UE), a wireless communication device, a terminal, a wireless terminal and/or other appropriate terminology.

Example Transmitter/Receiver

Figure 2A:
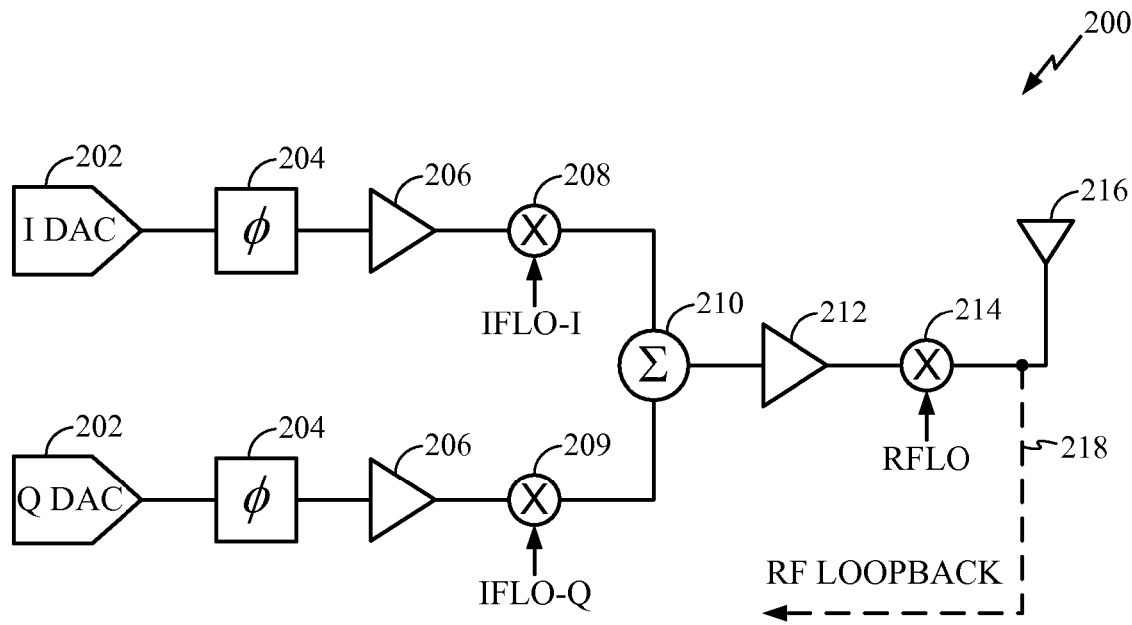
FIG. 2A illustrates an example transmitter in accordance with certain embodiments of the present invention.
Figure 2B:
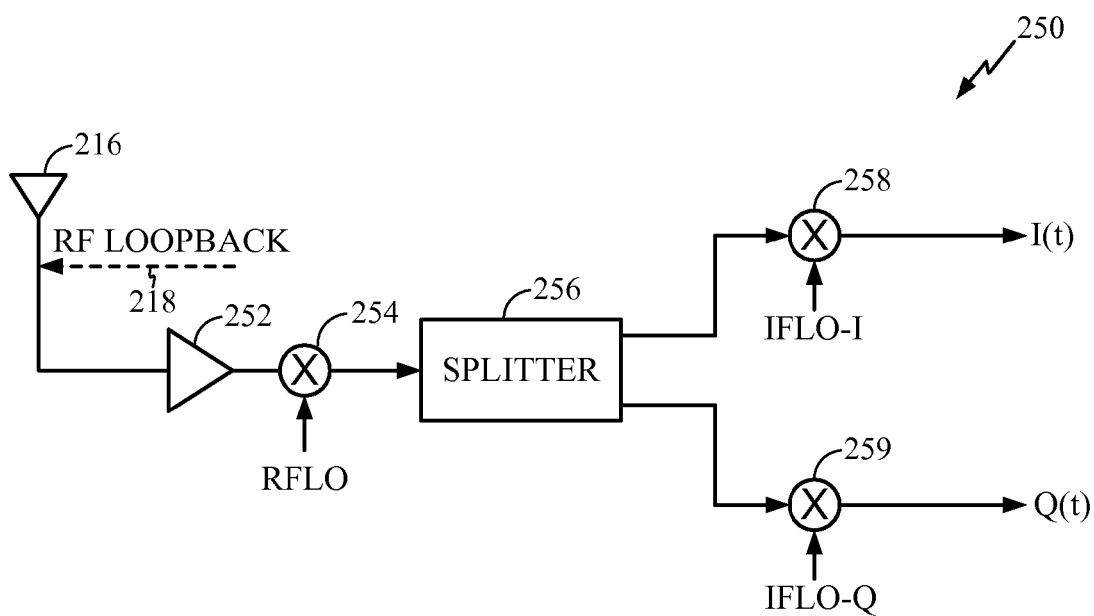
FIG. 2B illustrates an example receiver in accordance with certain embodiments of the present invention.

FIGS. 2A and 2B illustrate an example transmitter 200 and receiver 250, respectively, that employ in-phase and quadrature signal (I/Q) modulation and demodulation front-end architectures.

Referring first to the transmitter 200, in phase (I) and quadrature (Q) signals are generated that are 90 out of phase relative to each other. The initial signal amplitudes may be controlled by digital to analog converters 202. The relative phase of the I/Q signals may be controlled by adjustable phase rotators 204, and the I/Q signals may be amplified by adjustable gain stages 206.

The I/Q signals may be fed to IF mixers 208, 209 driven by intermediate frequency local oscillator signals (IFLO-I, IFLO-Q) and the resulting IF signals may be summed by summer 210. The summed IF signal may be by amplified by another adjustable gain stage 212 before being fed to a mixer 214 driven by a radio frequency local oscillator (RFLO) signal (or, alternatively, gain 212 and mixer 214 may be reversed in order). The resultant RF signal may then be transmitted by antenna 216.

The receiver 250, on the other hand, receives an RF signal via antenna 216 (which may be the same antenna used by the transmitter 200 or a separate antenna) and extracts the I and Q signal components. The received RF signal is amplified by a gain stage 252 (e.g., a low noise amplifier), before being passed through RF mixer 254 and split 256 into I and Q signal components. The I/Q signals are downconverted by IF mixers 258, 259 and forwarded on for digital signal processing. Note that IF mixer 259 can include (though not expressly shown here) a 90 degree phase shift element.

While the transmitter and receiver of FIGS. 2A and 2B are illustrated separately, they can be combined into one transceiver unit. Further, for further generality, the dual stage transmitter and receiver shown can include more or fewer stages. For example, a direct or zero intermediate frequency (ZIF) radio demodulation technique may be used with certain embodiments, where a ZIF does not use an intermediate frequency, but utilizes only one mixer stage to convert the desired signal directly to and from the baseband without any IF stages.

Those skilled in the art will recognize that certain components not illustrated may be incorporated in the I and Q chains, such as various low-pass, high-pass, and band-pass filters designed to remove unwanted signal components. Despite this filtering, phase and amplitude differences (imbalances) in the I and Q signal paths of the modulator (TX) and demodulator (RX) can introduce a deterministic, but deleterious spurious signal components that lie in the signal spectral band (in-band distortion).

The impact of these signal components can be minimized by adjusting gain and/or phase settings in an effort to modify the transmitted/received waveform to compensate. This characterization may be performed during a calibration routine by examining the IF signal generated by output of the summed I and Q IF signals (output from summer 210).

I/Q Calibration with RF Loop Back

Unfortunately, in I/Q architectures mixing-product modulated images (which may include higher-order mixing-product modulated images) introduced in the RF mixer are not removed using IF signal based I/Q calibration. This is often the case in super-heterodyne front-end architectures when the intermediate frequency (IF) has an integer relation to the radio-frequency (RF).

In such systems, the RF frequency commonly equals the IF frequency times an integer multiple M (e.g., RF=4*IF); this can be referred to a walking-IF system. With careful selection of high versus low side injection in the two (IF and RF) mixing stages and careful selection of the multiple M, the majority of the mixing spurs common to a super-heterodyne front-end land in the same frequency band as the signal of interest. This allows for higher power transmission in spectral locations adjacent to restricted frequency bands in which spurious signals are required to be at very low levels.

Unfortunately, however, mixing-product modulated images result in spurious energy that lands in the signal band, which can potentially distort the signal of interest. The spurious energy that lands in-band can be broken into at least three classes: discrete spurs due to the IF LO and/or RF LO signals or their harmonics, modulated spurs that land in band with the same frequency orientation as the desired signal (simply copies of the desired signal with a different phase and amplitude response), and modulated spurs that land in-band with frequency orientation flipped from that of the desired signal.

The modulated spur signal components may have similar characteristics to the distortion introduced by I/Q amplitude and phase imbalance described above. As a result, certain embodiments of the present invention may be able to reduce their impact using techniques similar to those used to compensate for I/Q phase and amplitude imbalance. However, rather than examine the IF signal, the RF signal should be examined downstream of the RF mixer.

By performing I/Q calibration based on the RF signal, contributions of mixing-product modulated images may be compensated for. As an added benefit, the techniques presented herein may also compensate for I/Q phase and amplitude imbalance.

Figure 3A:
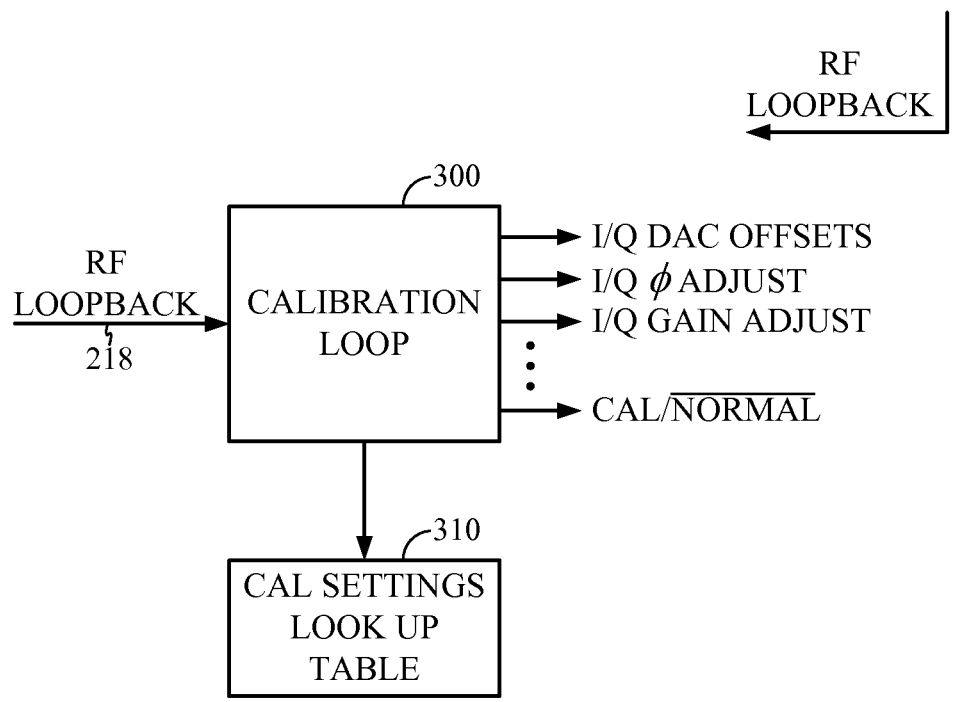
FIGS. 3 and 3A illustrate examples of calibration logic, in accordance with certain embodiments of the present invention.

Referring back to FIG. 2A, an RF feedback signal 218 may be provided to allow for RF-based calibration. As illustrated in FIG. 3A, calibration logic 300 may examine this RF feedback 218 and make adjustments (e.g., to gain and/or phase of the I and/or Q signal paths) to compensate for unwanted signal components.

As will be described in greater detail below, the calibration logic 300 may receive the RF loopback signal as input and generate one or more output signals to control components in the transmitter during calibration operations. The calibration logic may be implemented in any suitable combination of hardware and/or software (e.g., as a processor, DSP, and/or ASIC).

For certain embodiments, rather than utilize an on-board (or on-chip) signal analyzer (or power detector, etc) to provide a measurement of the RF signal, external test equipment may be utilized to measure the signal and feed the measurement. Further, while calibration loop may be used to feed a calibrated TX signal for calibrating receiver circuitry, a known good signal may also be provided by an external source.

Figure 3B:
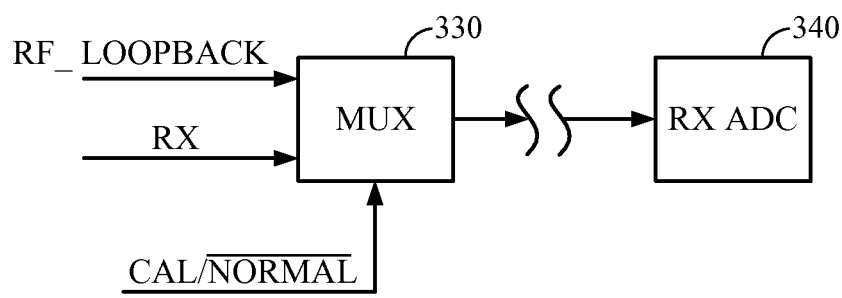

Further, for certain embodiments, the calibration logic 300 may utilize existing on-chip circuitry for calibration purposes. For example, as illustrated in FIG. 3B, for certain embodiments, receiver components, such as receiver analog to digital converters (ADC) 340 may be utilized to help examine the RF loopback signal. As illustrated, the calibration logic may control a multiplexer 330 to select whether an actual received signal (RX) or the RF loopback signal is ultimately supplied to the ADC 340. Thus the ADC 340 may provide the calibration logic 300 with a value indicative of the RF signal power, voltage level, or the like. Note that for clarity, certain components, modules or elements have been conveniently omitted from the path between multiplexer 330 and ADC 340, which might include certain gain stage(s), mixer(s), splitter(s), and the like, as depicted in one or more other figures within this disclosure (e.g., FIG. 2B).

Because the relative energy level of in-band spurious components is also a function of the gain distribution throughout the I/Q front-end, as the gain relationship between the RF and IF stages change, the spurious levels may also change. Therefore, the calibration correction coefficients are preferably dynamically controllable to compensate over a variety of gain combinations. Therefore, the calibration logic 300 may be configured to repeat the calibration operations for different gain combinations. The calibration results (e.g., optimal gain and/or phase setting) for each gain combination may be stored in a lookup table 310 (e.g., in non-volatile memory such as EEPROM). In operation, when a particular gain combination is used, the corresponding calibration settings may be retrieved and applied.

The correction coefficients may also be dynamically controllable to compensate for other changes that can affect the energy level of in-band signals, such as changes in temperature, changes in RF center frequency, and the like. To compensate for such changes, calibration operations may be performed periodically (e.g., hourly, daily, or more frequently), upon the detection of the occurrence of certain triggering events (e.g., power reset, change in temperature, signal quality, bit error rate, or the like), or based upon some other schedule.

Furthermore, the overall range of correction for a walking-IF scheme may be greater than for a traditional super-heterodyne system. Generally, a super-heterodyne scheme includes any frequency conversion technique that makes use of both at least one IF local oscillator and at least one RF local oscillator. A walking-IF scheme is a subset of the super-heterodyne category, where the RF local oscillator is an integer multiple of the IF local oscillator, such that the IF frequency can follow or "walk" along with the RF frequency.

Example RF-Based I/Q Calibration Operations

Figure 4:
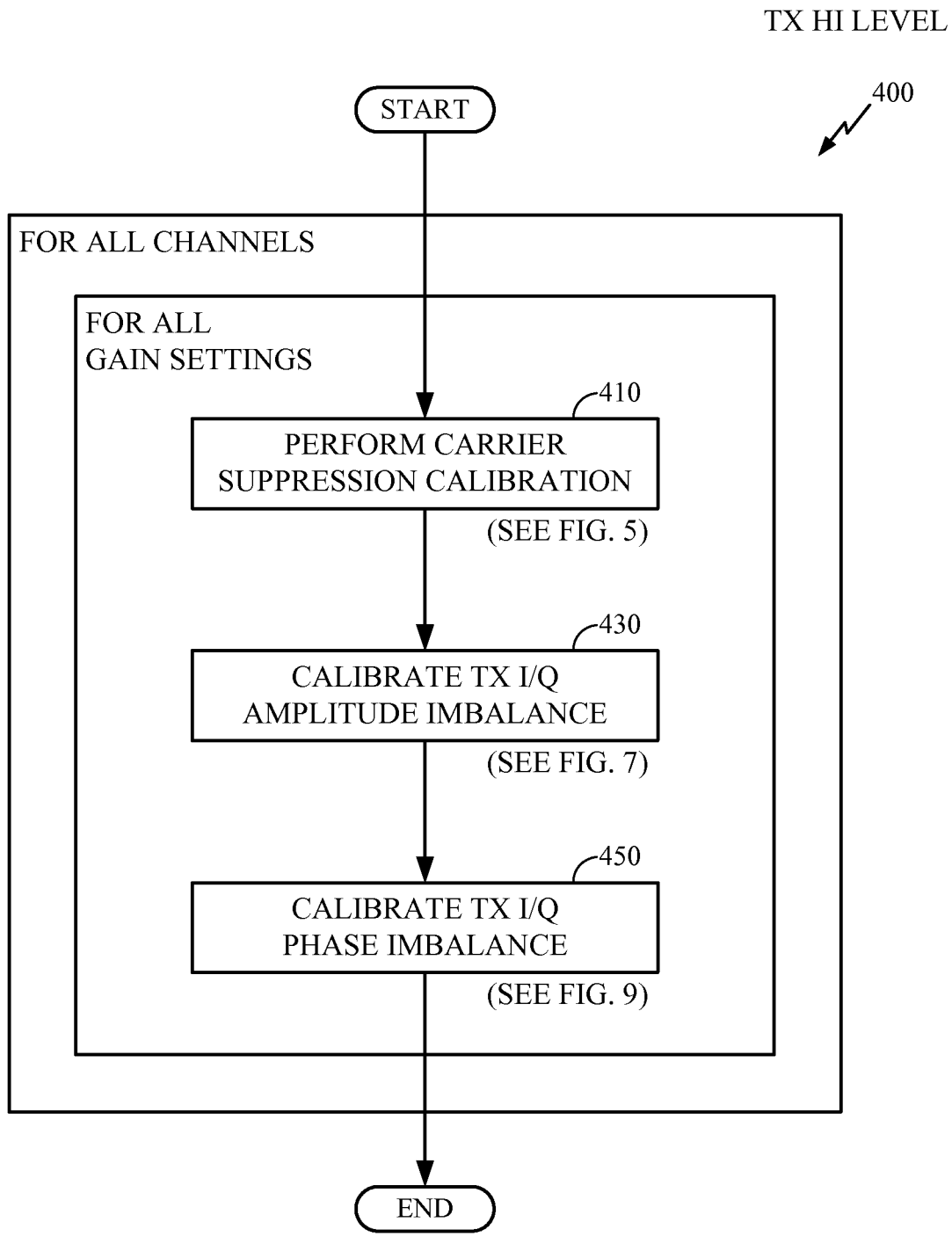
FIGS. 4 and 4A illustrate examples of operations for transmitter calibration in accordance with certain embodiments of the present invention.

FIG. 4 illustrates an example of operations 400 that may be performed for jointly estimating distortion introduced by I/Q imbalance and the "flipped" in-band spurious energy related to a walking IF front-end. The operations may be performed, for example, by calibration logic 300 described above. For certain embodiments, the operations may be performed for all channels (RF frequencies), and for all gain settings. Further, as discussed above, the operations may also be performed at different times, for example, periodically or upon the detection of the occurrence of certain triggering events.

Carrier Suppression Calibration

Figure 5:
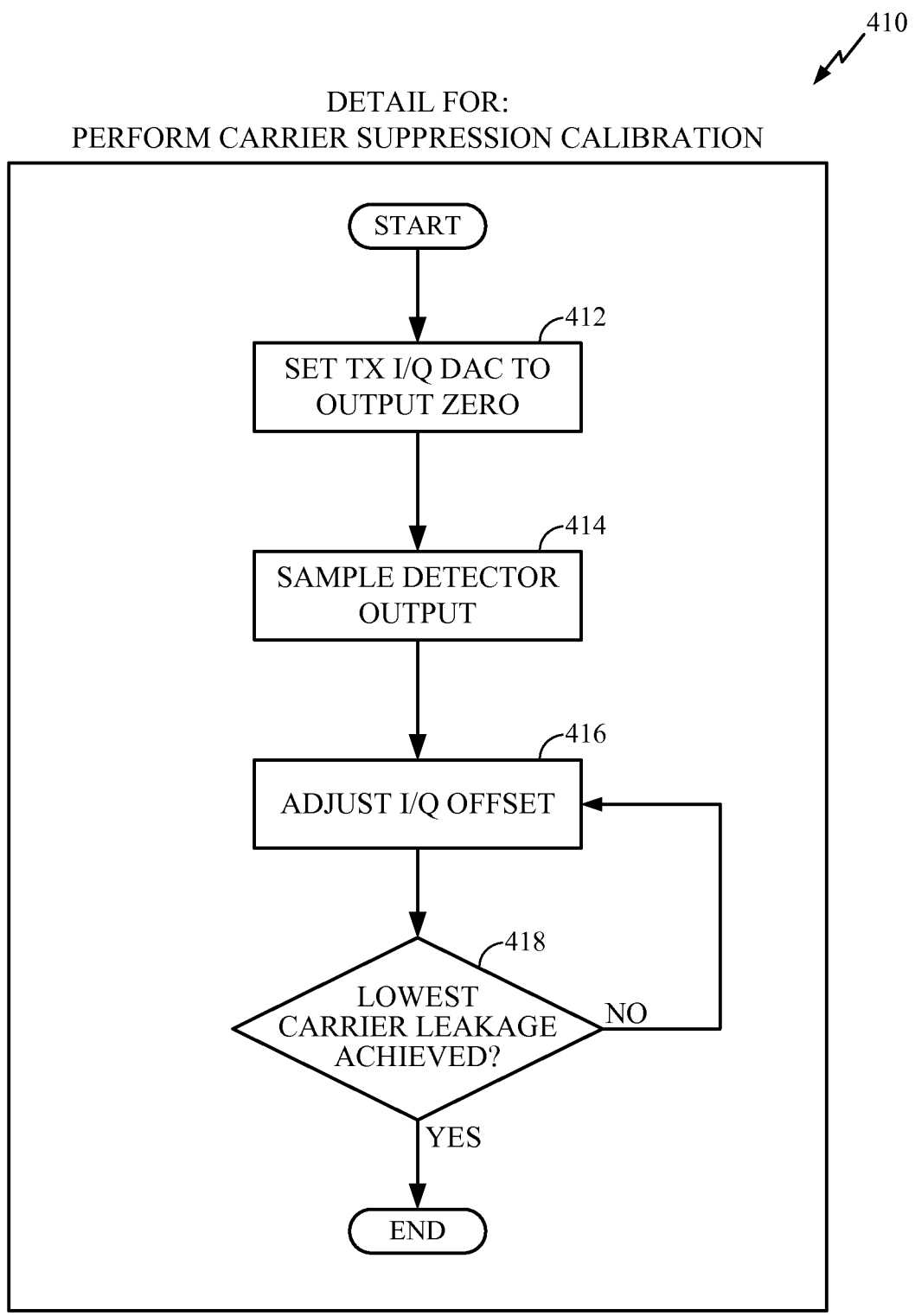
FIG. 5 illustrates example operations for carrier suppression in accordance with certain embodiments of the present invention.

The operations 400 begin, at 410, by performing carrier suppression calibration. FIG. 5 illustrates operations 410 for carrier suppression in accordance with one algorithm. The operations 410 may be described with reference to FIGS. 6A and 6B, which illustrate an example transmitter in various states of calibration.

Figure 6A:
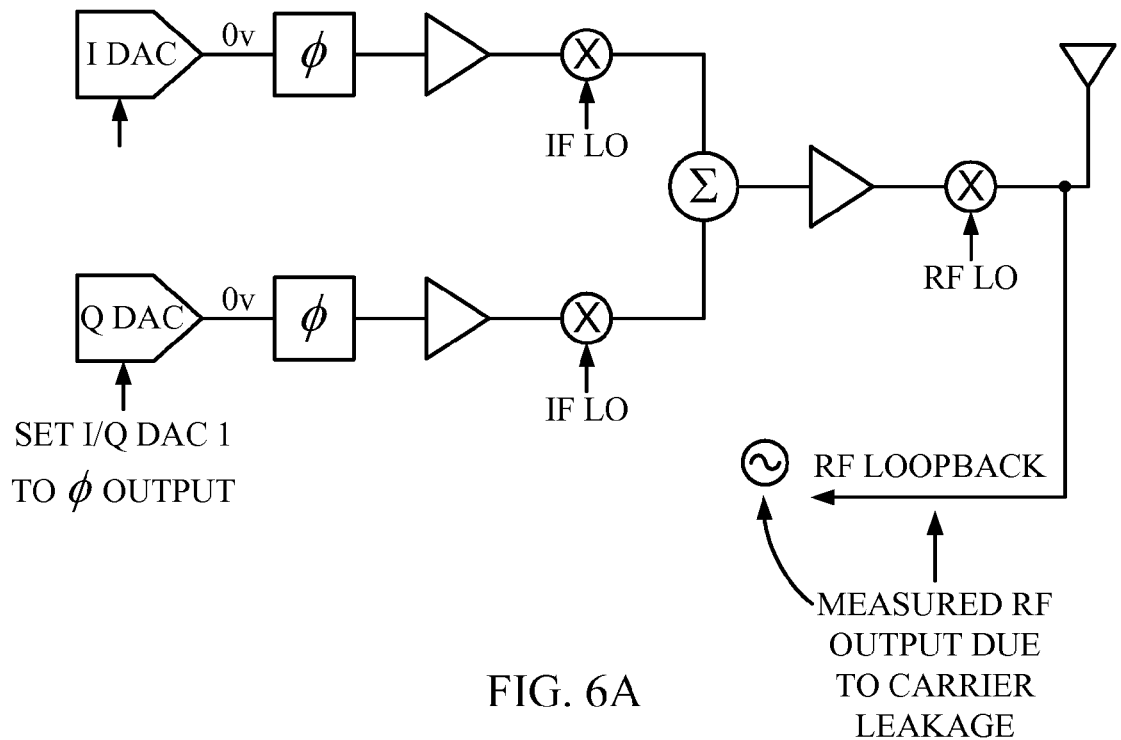
FIGS. 6A-6B illustrate an example transmitter during carrier suppression operations, in accordance with certain embodiments of the present invention.

The operations 410 begin by setting transmit I and Q DAC outputs to zero, at 412, and sampling the RF output, at 414. As illustrated in FIG. 6A, any RF output will be due to carrier leakage. This leakage may be measured by feedback from an on-chip RF TX power detector or a peak detector on the RF TX output. As described above, MUX logic may allow RF output to be sampled by RX ADCs. Using on-chip logic may lessen the chip real estate requirement, provided the detector dynamic range is sufficient for the calibration.

Figure 6B:
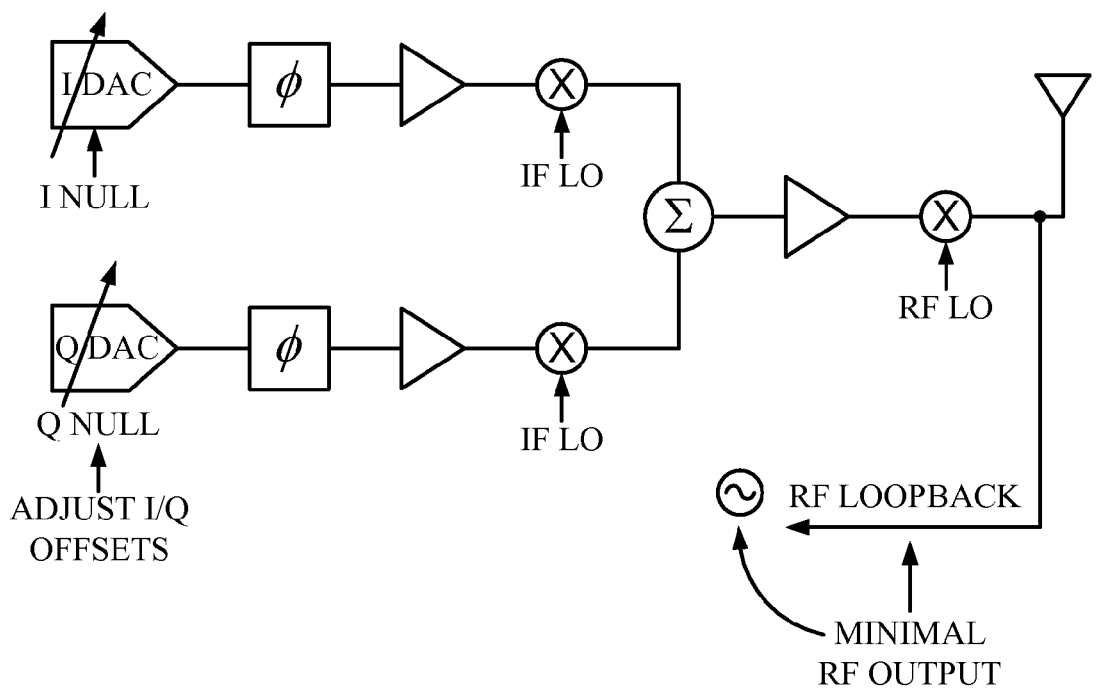

At 416 and 418, the DC offsets of the I and Q DACs may be iteratively adjusted until the RF output is below a desired threshold. As illustrated in FIG. 6B, with the I and Q DAC offsets set at appropriate levels, the RF output due to leakage may be minimal.

I/Q Amplitude Imbalance Calibration

Figure 7:
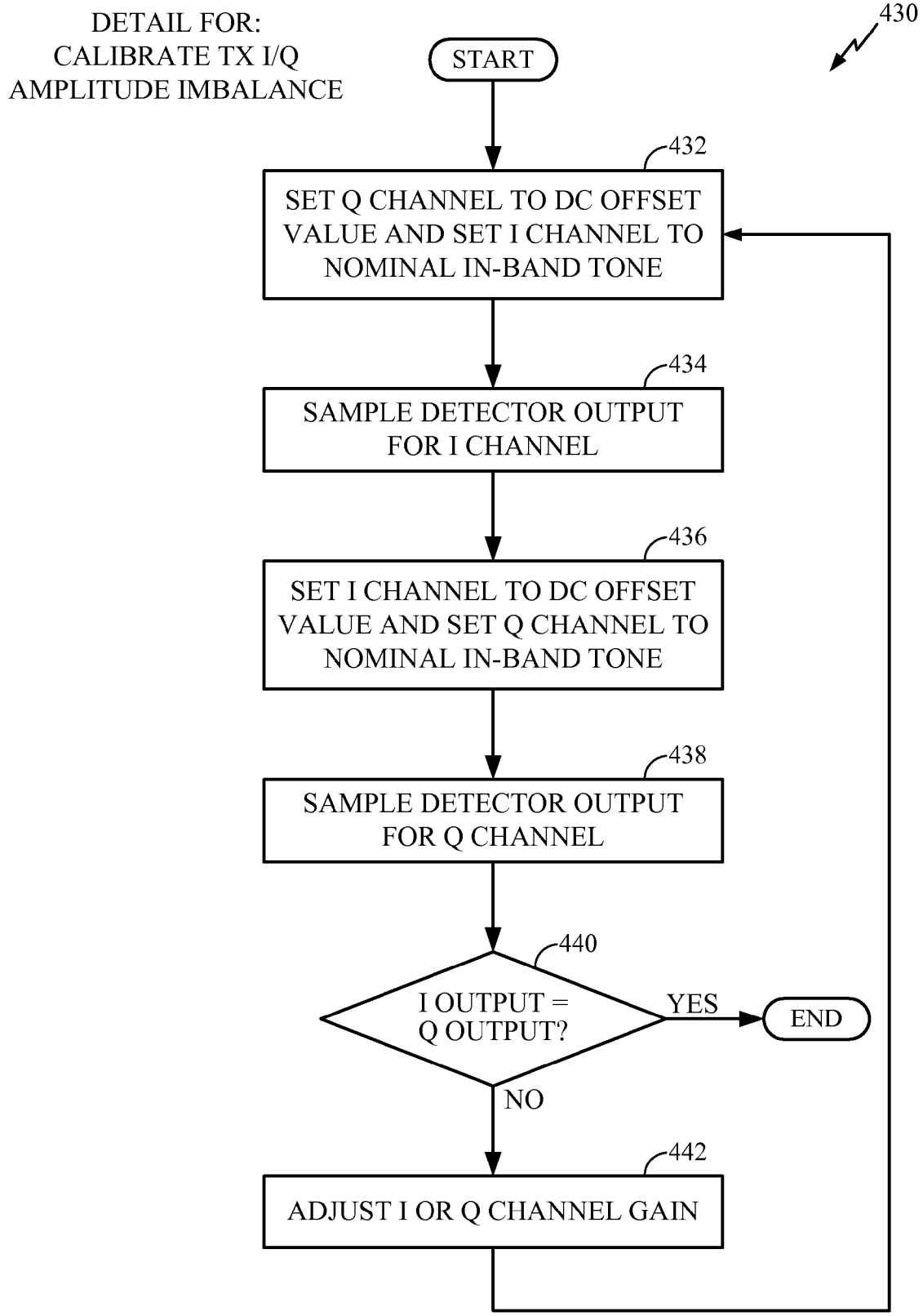
FIG. 7 illustrates example operations for I/Q amplitude imbalance calibration in accordance with certain embodiments of the present invention.

Referring back to FIG. 4, after carrier suppression calibration, I/Q amplitude imbalance calibration may be performed, at 430. FIG. 7 illustrates operations 430 for I/Q amplitude imbalance calibration in accordance with one algorithm. The operations 430 may be described with reference to FIGS. 8A-8C, which illustrate an example transmitter in various states of calibration.

Figure 8A:
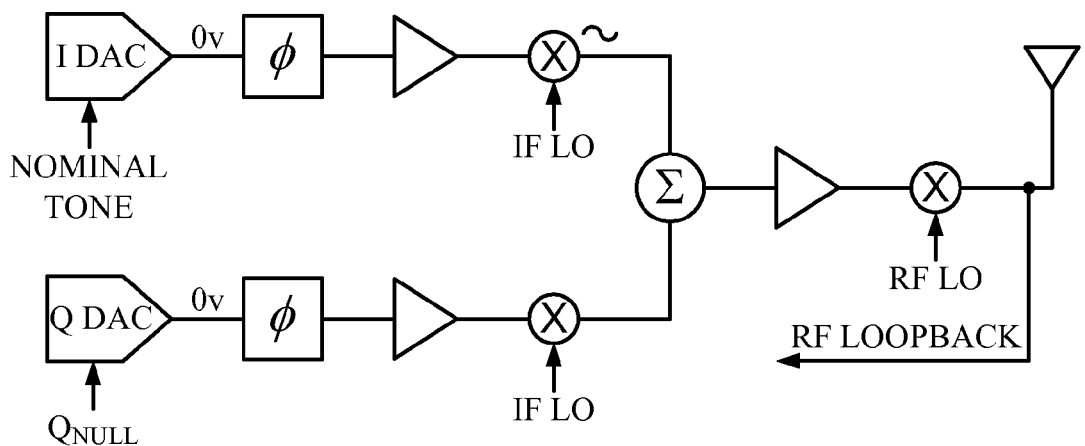
FIGS. 8A-8C illustrate an example transmitter during I/Q amplitude imbalance calibration.

The operations 430 begin, at 432, by setting the transmit Q channel to the DC null offset value (determined above) and setting the I channel to a nominal in-band tone. For certain embodiments, this may be accomplished by transmitting a real part of an N point IFFT of a known signal XA on the I channel, where XA is all zeroes except at a tone K, while the Q channel is zero. As illustrated in FIG. 8A, this will result in the RF output being primarily due to the I channel. At 434, this I channel output is sampled.

Figure 8B:
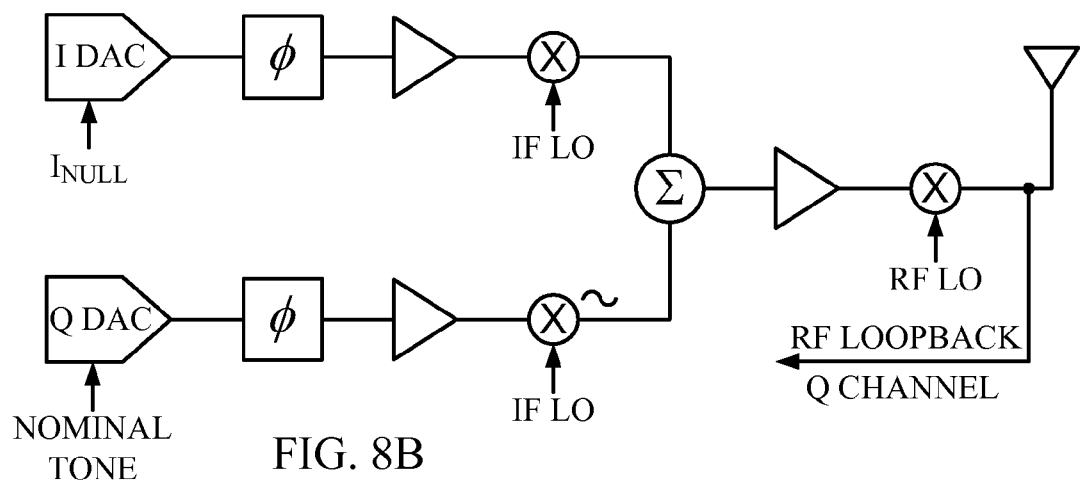

At 436, the transmit I channel is set to the DC null offset value and the Q channel is set to a nominal in-band tone. For certain embodiments, this may be accomplished by transmitting the imaginary part of the N point IFFT of a known signal XA on the Q channel, while I Q channel is zero. As illustrated in FIG. 8B, this will result in the RF output being primarily due to the Q channel. At 438, this Q channel output is sampled.

Figure 8C:
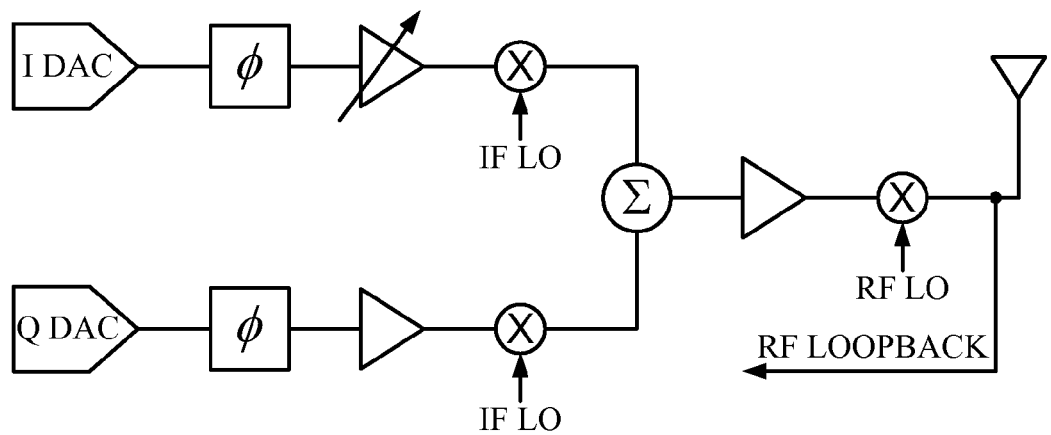

At 440, the sampled I and Q channel outputs are compared. If the outputs do not match the amplitudes are considered to be unbalanced and at least one of the I and Q channel gains are adjusted, at 442, and the operations are repeated. For certain embodiments, to simplify the algorithm, the gain of only one channel may be adjusted. For example, FIG. 8C illustrates the I channel gain being adjusted. The amplitude may be adjusted in accordance with a TX IQ amplitude correction value based on the ratio of the square root of the sampled RF power measurements: Sqrt(PowerI/PowerQ). In any case, once the sampled I and Q channel RF outputs match, the amplitudes are considered sufficiently balanced and the operations are terminated. For certain embodiments, the TX IQ imbalance (either phase or amplitude) may alternatively be corrected in the digital domain (e.g., before the DAC and/or after the ADC, as applicable).

I/Q Phase Imbalance Calibration

Referring back to FIG. 4, after I/Q amplitude calibration (or before), I/Q phase imbalance calibration may be performed, at 450. The operations basically involve transmitting known signals that are offset in phase, but that should result in equal RF outputs if the I and Q phases are in balance.

Figure 9:
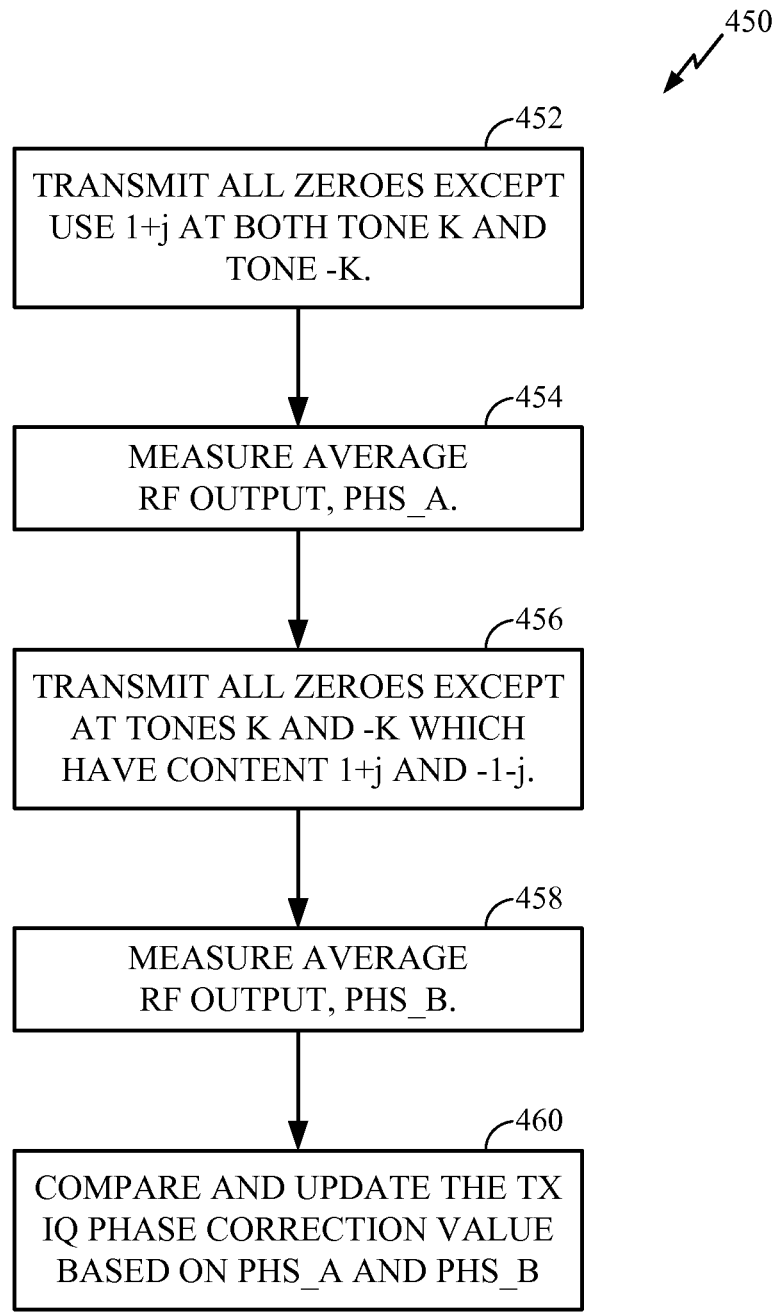
FIG. 9 illustrates example operations for I/Q phase imbalance calibration in accordance with certain embodiments of the present invention.

FIG. 9 illustrates example operations 450 for I/Q phase imbalance calibration in accordance with one algorithm. The operations 450 may be described with reference to FIGS. 10A-10C, which illustrate an example transmitter in various states of calibration.

Figure 10A:
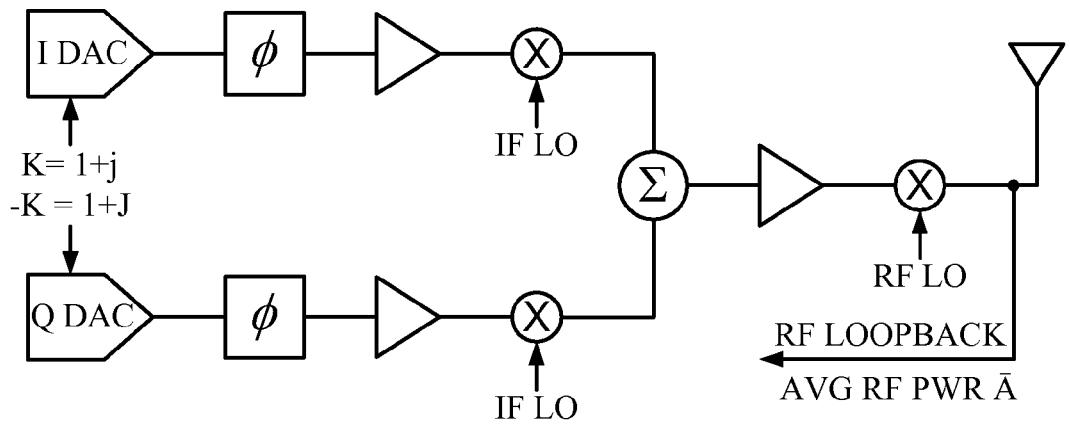
FIGS. 10A-10C illustrate an example transmitter during I/Q phase imbalance calibration.

The operations 450 begin, at 452, by transmitting a known signal with zeroes at all tones except tones K and −K, which both use 1+j. At 454, the average RF output at this setting (labeled PHS_A) is measured. This setting is illustrated in FIG. 10A.

Figure 10B:
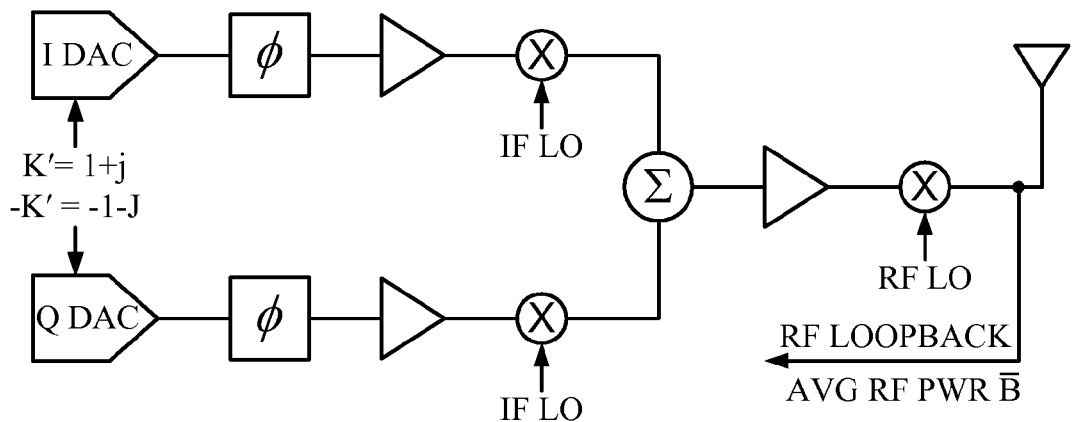

At 456, a different (e.g., complementary) known signal, with zeroes at all tones except tones K' and −K', which are set at 1+j and −1−j. At 458, the average RF output at this setting (labeled PHS_B) is measured. This setting is illustrated in FIG. 10B.

Figure 10C:
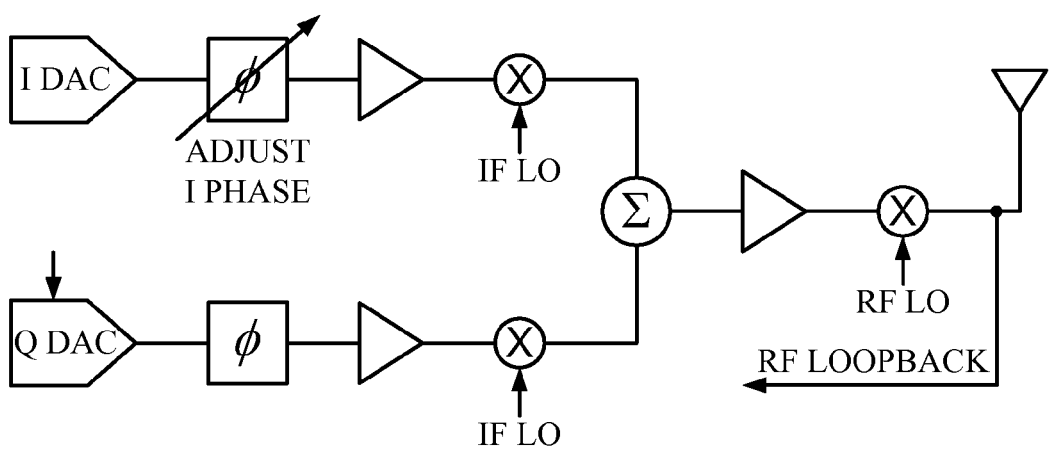

The two signals, K and K' may have been selected so the average power should have been the same if the I and Q phases were in balance. Therefore, at 460, the power measurements are compared and a TX phase correction value is updated based on the power measurements. For example, the TX IQ phase correction value may be updated based on an estimate derived from the known relationship between the signals K and K'. For certain embodiments, this correction factor may be calculated as:

$$\text{Phi}' = -0.5 * \arctan(D/S),$$

where D=PHS_A−PHS_B and S=PHS_A+PHS_B. Small signal approximations for the arctan may also be used. As illustrated in FIG. 10C, a single one of the phases may be adjusted to compensate for the detected imbalance.

Figure 11:
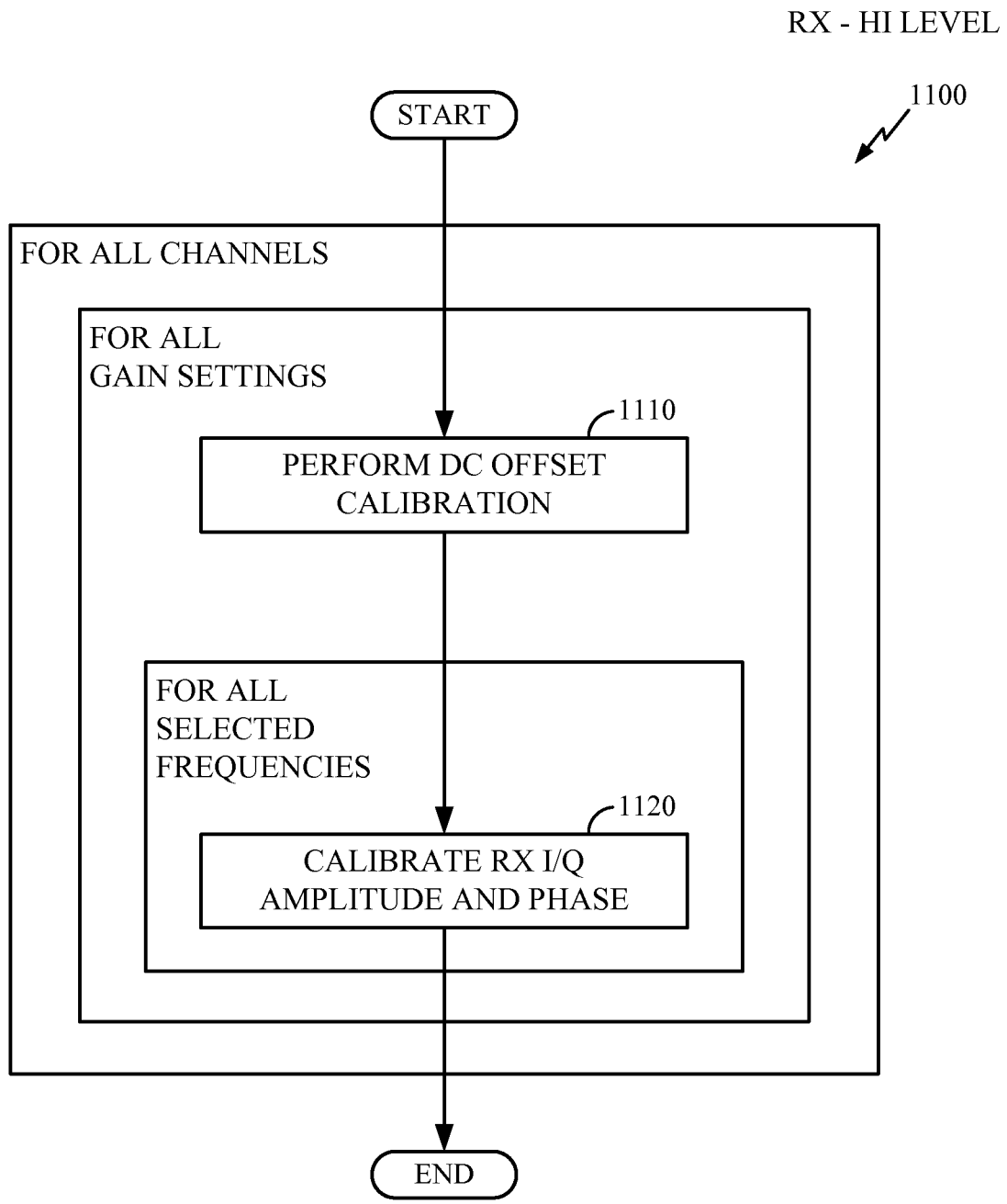
FIGS. 11 and 11A illustrate examples of operations for receiver calibration in accordance with certain embodiments of the present invention.

As illustrated in FIG. 11, calibration operations 1100 may also be performed on the receiver side. At 1110, DC offset calibration may be performed, for example, to adjust offsets introduced by the RX analog components in the receiver (e.g., mixers, amplifiers, active filters, the ADCs, and the like). At 1120, I/Q amplitude and phase calibration may be performed for the receiver.

Figure 12:
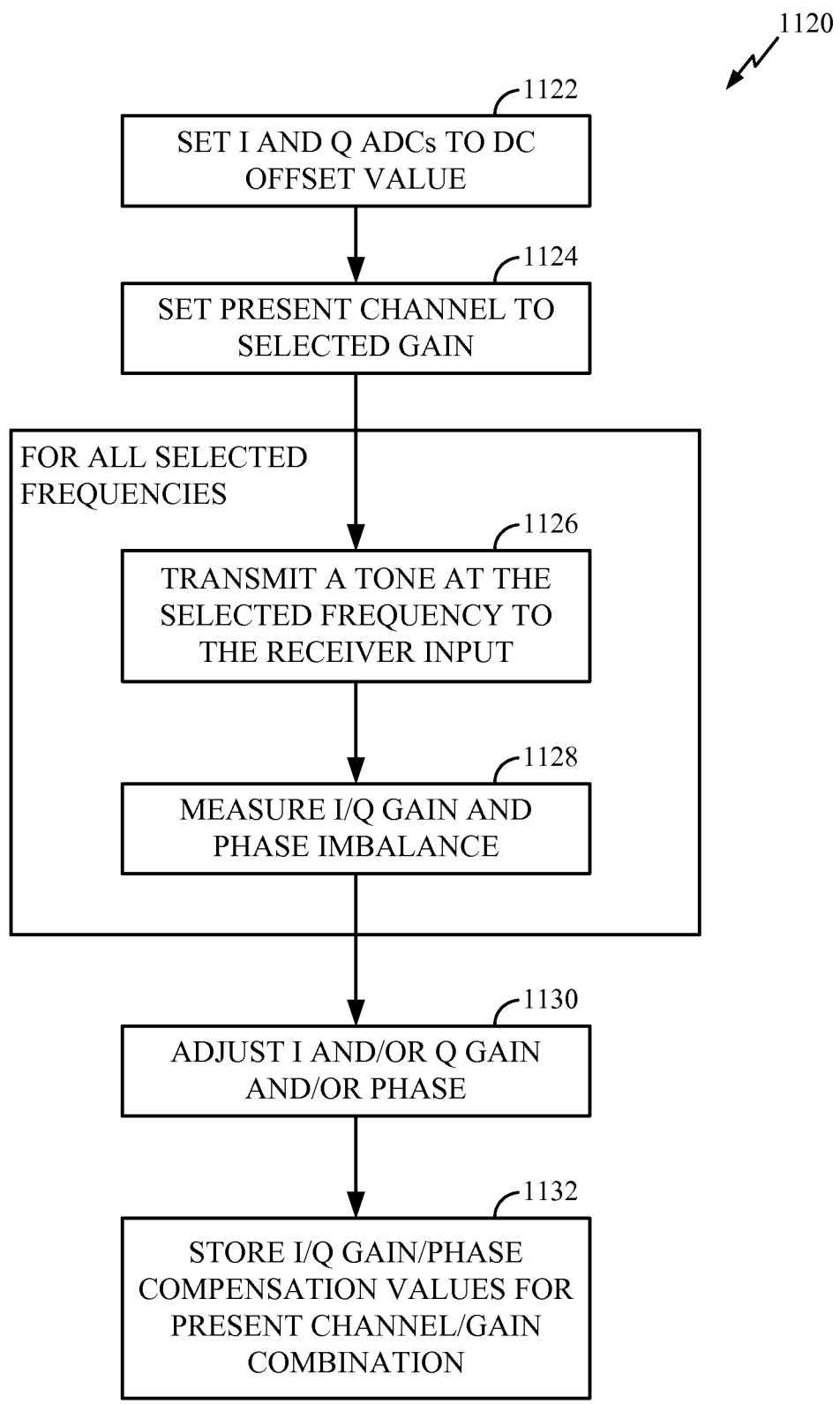
FIG. 12 illustrates example operations for I/Q amplitude and phase imbalance calibration for a receiver in accordance with certain embodiments of the present invention.

FIG. 12 illustrates example operations 1120 for RX I/Q amplitude and phase calibration. The operations 1120 begin, at 1122, by setting the I and Q channel ADCs to the DC offset values (determined in 1110) while shorting the receiver input at the RF (to produce a zero input). At 1124, a selected gain for a selected channel (RF frequency) under calibration is set.

At 1126, a tone is transmitted at the selected RF frequency to the receiver input. As previously described, for certain embodiments, the tone may be transmitted using RF loopback on a TX channel calibrated using the techniques described above. At 1128, I/Q gain and phase imbalance may be estimated. The gain and phase may be estimated using known techniques, based on an expected received signal and the actual measured received signal.

At 1130, the gain and/or phase of the I and/or Q channel may be adjusted based on the measurements in 1128 with gain/phase compensation values. At 1132, the gain/phase compensation values for the present channel/gain combination are stored for future use. As described above, the RX calibration operations may be repeated for different channel gain combinations.

By utilizing RF signal detection, certain embodiments of the present invention allow compensation for distortion introduced by both mixing-product modulated image components and I/Q amplitude and phase imbalance compensation. Techniques utilizing IF signal detection only (before RF mixing) may be able to compensate for I/Q imbalance, but not the RF mixing-product modulated image components.

Figure 13:
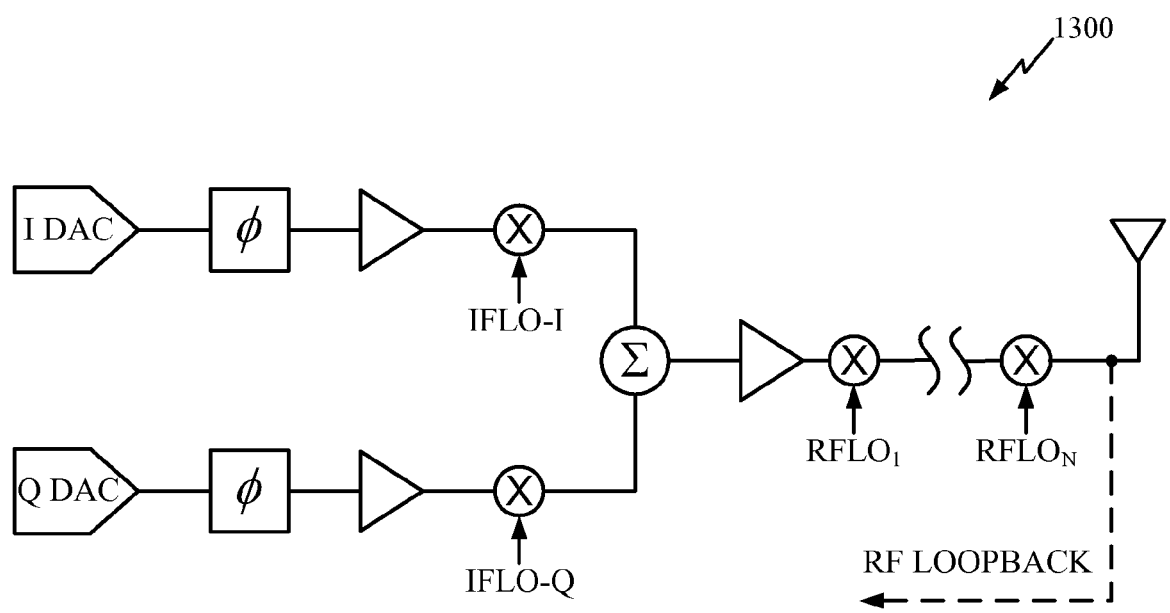
FIG. 13 illustrates a system with one IF mixing stage and N RF mixing stages in accordance with certain embodiments of the present invention.

The techniques may be applied for systems utilizing fewer (as mentioned above with respect to a direct or ZIF radio) or more than two mixing phases (e.g., more than just one IF mixing stage and one RF mixing stage). For example, FIG. 13 illustrates a system 1300 with one IF mixing stage and N RF mixing stages. In such an exemplary system, the IF local oscillator and the N RF local oscillators can be related by integer values. As illustrated, each RF mixing stage may driven by a corresponding RF local oscillator signal (RFLO1 to RFLON). As illustrated, for certain embodiments, the final transmitted RF signal may be relatively high such as 60 GHZ, depending on the particular selection of the RFLO frequencies.

Figure 4A:
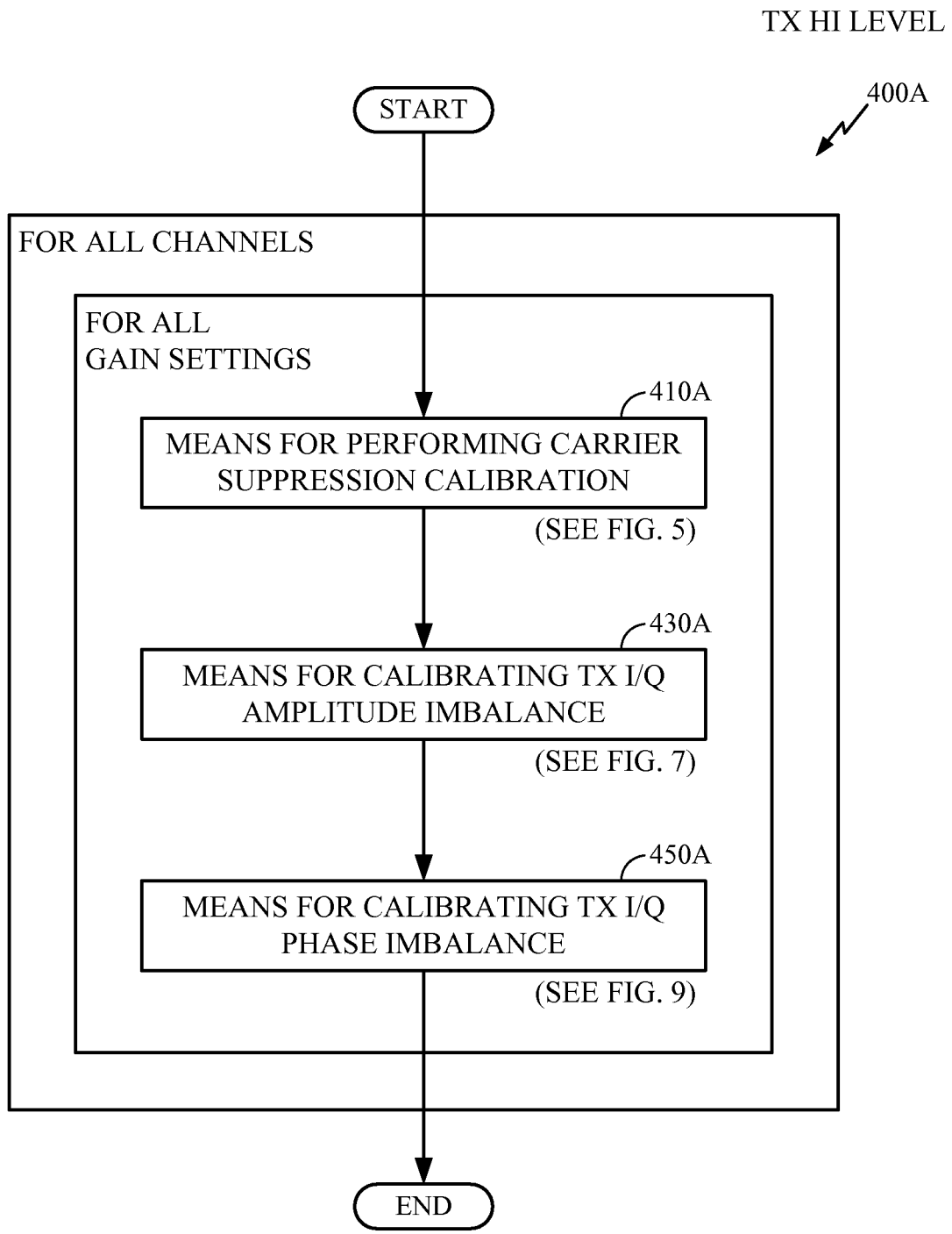
Figure 11A:
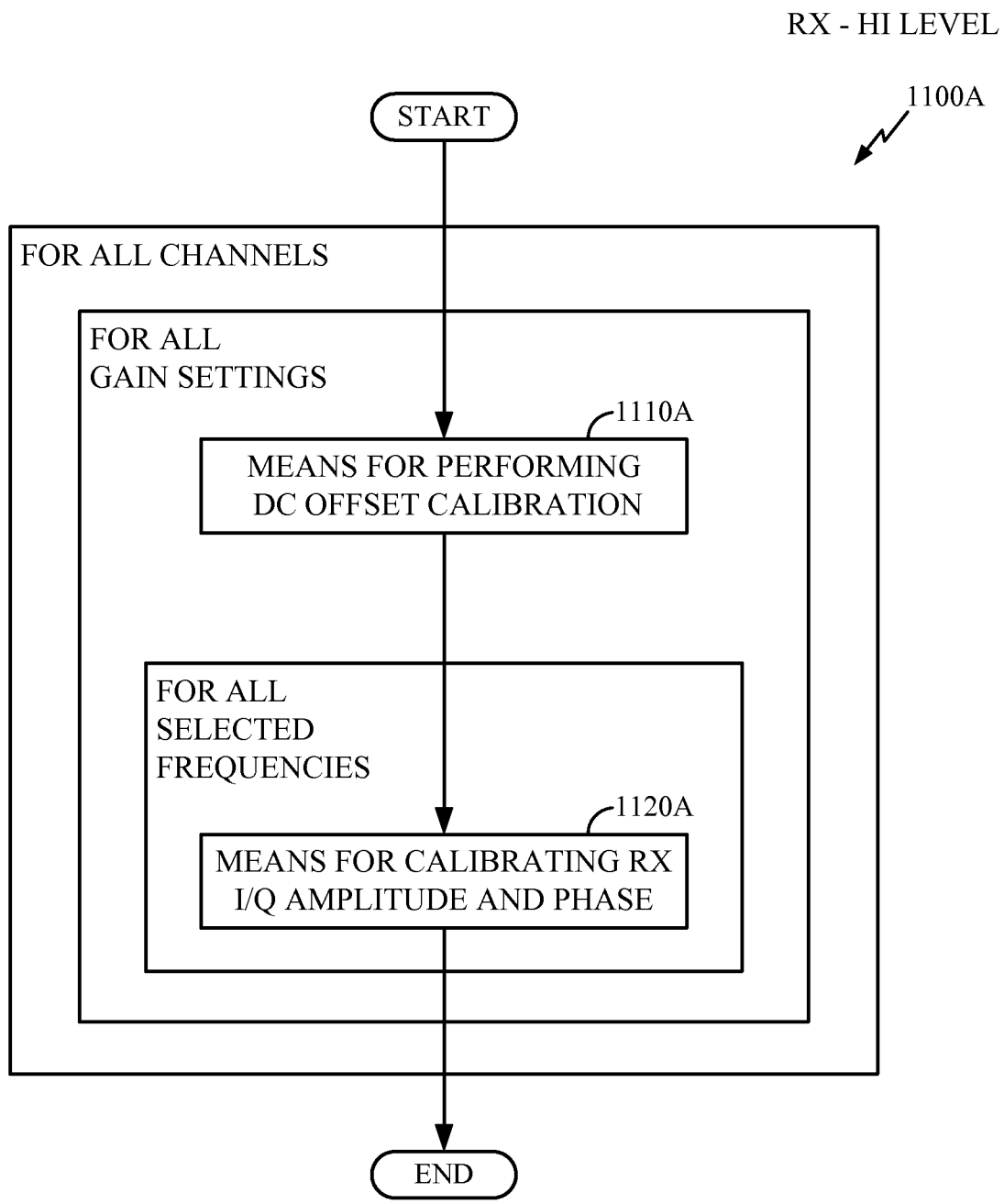

The various operations of methods described above may be performed by various hardware and/or software component(s) and/or module(s) corresponding to means-plus-function blocks illustrated in the Figures. For example, blocks 410-450 illustrated in FIG. 4 correspond to means-plus-function blocks 410A-450A illustrated in FIG. 4A while blocks 1110 and 1120 illustrated in FIG. 11 correspond to means-plus-function blocks 1110A and 1120A illustrated in FIG. 11A. More generally, where there are methods illustrated in Figures having corresponding counterpart means-plus-function Figures, the operation blocks correspond to means-plus-function blocks with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to certain embodiments of the present invention, other and further certain embodiments of the invention may be devised without departing from the basic scope thereof, and the scope thereof is determined by the claims that follow.

What is claimed is:

1. A method, comprising:
summing an in-phase (I) IF signal with a quadrature (Q) IF signal in a transmitter to generate a summed signal, wherein the transmitter comprises at least one IF stage;
mixing an RF local oscillator signal with the summed signal to generate an RF signal, wherein the RF signal has mixing-product modulated image components in a frequency band;
detecting at least one parameter of the RF signal; and
using at least the detected parameter, adjust at least one digital to analog converter (DAC) to reduce effects of both I/Q imbalance and the mixing-product modulated image components.

2. The method of claim 1, further comprising:
repeating the summing, mixing, and detecting to dynamically generate values to adjust at least one of the I and Q IF signals.

3. The method of claim 2, wherein:
repeating the summing, mixing, and detecting comprises repeating the summing, mixing, and detecting periodically.

4. The method of claim 2, wherein:
repeating the summing, mixing, and detecting comprises repeating the summing, mixing, and detecting upon the detection of a trigger event.

5. The method of claim 2, further comprising:
storing values used to adjust the at least one of the I and Q IF signals.

6. The method of claim 5, further comprising:
repeating the summing, mixing, and detecting to generate values to adjust at least one of the I and Q IF signals for a plurality of gain settings for circuitry used to generate at least one of the I IF signal, the Q IF signal, and the RF signal.

7. The method of claim 1, wherein detecting at least one parameter of the RF signal comprises detecting average power of the RF signal.

8. The method of claim 1, wherein detecting at least one parameter of the RF signal comprises detecting the at least one parameter with a device external to a device containing logic for the summing and mixing.

9. The method of claim 1, further comprising:
controlling a multiplexer, during a calibration mode, to provide the RF signal to receive circuitry contained on a device containing logic for the summing and mixing; and
controlling the multiplexer to provide an externally received RF signal to the receive circuitry during an operating mode.

10. The method of claim 1, wherein the adjusting at least one of the I and Q IF signals comprises at least one of:
adjusting a gain of at least one of the I and Q IF signals to reduce effects of I/Q amplitude imbalance; and
adjusting a phase of at least one of the I and Q IF signals to reduce effects of I/Q amplitude imbalance.

11. The method of claim 10, wherein the at least one adjusting is performed in a digital domain.

12. The method of claim 10, wherein adjusting a gain of at least one of the I and Q IF signals to reduce effects of I/Q amplitude imbalance comprises:
applying a first I/Q setting adjusting the Q IF signal to a known DC offset value and the I IF signal to a known in-band tone;
detecting at least one parameter of the RF signal at the first I/Q setting;

applying a second I/Q setting adjusting the Q IF signal to a known in-band tone and the I IF signal to a known DC offset value;
detecting at least one parameter of the RF signal at the second I/Q setting; and
using the parameters detected at the first and second settings to adjust at least one of the I and Q IF signals to reduce effects of I/Q amplitude imbalance.

13. The method of claim 10, wherein adjusting a phase of at least one of the I and Q IF signals to reduce effects of I/Q phase imbalance comprises:
applying a first I/Q setting to generate an RF signal with first known content using energy at tones K and −K;
detecting at least one parameter of the RF signal at the first I/Q setting;
applying a second I/Q setting to generate an RF signal with second known content using energy at tones K and −K;
detecting at least one parameter of the RF signal at the second I/Q setting; and
using the parameters detected at the first and second settings to adjust at least one of the I and Q IF signals to reduce effects of I/Q phase imbalance.

14. The method of claim 10, wherein:
at a first I/Q setting, the RF signal has content 1+j at the K tone and 1+j at the −K tone; and
at a second I/Q setting, the RF signal has content 1+j at the K tone and −1−j at the −K tone.

15. The method of claim 1, wherein mixing an RF local oscillator signal with the summed signal to generate an RF signal comprises utilizing multiple stages of RF mixing with RF local oscillator signals.

16. A device that performs modulation for wireless communications, comprising:
a component that sums an in-phase (I) IF signal with a quadrature (Q) IF signal in a transmitter to generate a summed signal, wherein the transmitter comprises at least one IF stage;
a component that mixes an RF local oscillator signal with the summed signal to generate an RF signal, wherein the RF signal has mixing-product modulated image components in a frequency band;
a component that detects at least one parameter of the RF signal; and
a component that uses the detected parameter to adjust at least one digital to analog converter (DAC) to reduce effects of both I/Q imbalance and the mixing-product modulated image components.

17. The device of claim 16, wherein components of the device are configured to:
repeat summing, mixing, and detecting to dynamically generate values to adjust at least one of the I and Q IF signals; and
the device comprises a component that stores values used to adjust the at least one of the I and Q IF signals.

18. The device of claim 17, wherein components of the device are configured to:
repeat summing, mixing, and detecting to generate values to adjust at least one of the I and Q IF signals for a plurality of gain settings for circuitry used to generate at least one of the I IF signal, the Q IF signal, and the RF signal.

19. The device of claim 16, further comprising:
a multiplexer controllable to provide the RF signal to receive circuitry containing the component that detects the at least one parameter of the RF signal during a calibration mode and to provide an externally received RF signal to the receive circuitry during an operating mode.

20. The device of claim 16, wherein the component that uses the detected parameter to adjust at least one of the I and Q IF signals to reduce effects of both I/Q imbalance and the mixing-product modulated image components adjusting a gain of at least one of the I and Q IF signals to reduce effects of I/Q amplitude imbalance is configured to:
apply a first I/Q setting to generate an RF signal with first known content and K and −K tones;
detect at least one parameter of the RF signal at the first I/Q setting;
apply a second I/Q setting to generate an RF signal with second known content and K and −K tones;
detect at least one parameter of the RF signal at the second I/Q setting; and
use the parameters detected at the first and second settings to adjust at least one of the I and Q IF signals to reduce effects of I/Q phase imbalance.

21. The device of claim 16, wherein the component that mixes an RF local oscillator signal with the summed signal to generate an RF signal utilizes multiple stages of RF mixing with RF local oscillator signals.

22. An apparatus that performs modulation for wireless communications, comprising:
means for summing an in-phase (I) IF signal with a quadrature (Q) IF signal in a transmitter to generate a summed signal, wherein the transmitter comprises at least one IF stage;
means for mixing an RF local oscillator signal with the summed signal to generate an RF signal, wherein the RF signal has mixing-product modulated image components in a frequency band;
means for detecting at least one parameter of the RF signal; and
means for adjusting at least one digital to analog converter (DAC), based on the detected parameter, to reduce effects of both I/Q imbalance and the mixing-product modulated image components.

23. The apparatus of claim 22, wherein the means for summing, mixing, detecting, and adjusting are configured to:
repeat summing, mixing, and detecting to generate values to adjust at least one of the I and Q IF signals for a plurality of gain settings for circuitry used to generate at least one of the I IF signal, the Q IF signal, and the RF signal.

24. The apparatus of claim 22, further comprising:
means for providing the RF signal to receiver means containing the means for detecting the at least one parameter of the RF signal during a calibration mode and for providing an externally received RF signal to the receive circuitry during an operating mode.

25. A computer-program product for performing modulation for wireless communications, the computer-program product comprising a computer readable medium having instructions thereon, the instructions comprising:
code for detecting at least one parameter of an RF signal generated by summing an in-phase (I) IF signal with a quadrature (Q) IF signal in a transmitter to generate a summed signal, wherein the transmitter comprises at least one IF stage, and mixing an RF local oscillator signal with the summed signal to generate an RF signal, wherein the RF signal has mixing-product modulated image components in a frequency band; and
code for adjusting at least one digital to analog converter (DAC), based on the detected at least one parameter of the RF signal, to reduce effects of both I/Q imbalance and the mixing-product modulated image components.

26. The computer-program product of claim 25, comprising code to:
repeat the detecting and adjusting to generate values to adjust at least one of the I and Q IF signals for a plurality of gain settings for circuitry used to generate at least one of the I IF signal, the Q IF signal, and the RF signal.

27. A method, comprising:
selecting known in-phase (I) and quadrature (Q) IF signals in a transmitter to be transmitted in a known frequency band, wherein the transmitter comprises at least one IF stage;
summing the I IF signal with the Q IF signal to generate a summed IF signal;
mixing an RF local oscillator signal with the summed IF signal to generate an RF signal, wherein the RF signal has mixing-product modulated image components in the known frequency band; and
using a detected average power of the RF signal, adjust at least one digital to analog converter (DAC) to reduce effects of the mixing-product modulated image components.

28. A system, comprising:
means for selecting known in-phase (I) and quadrature (Q) IF signals in a transmitter to be transmitted in a known frequency band, wherein the transmitter comprises at least one IF stage;
means for summing the I IF signal with the Q IF signal to generate a summed IF signal;
means for mixing an RF local oscillator signal with the summed IF signal to generate an RF signal, wherein the RF signal has mixing-product modulated image components in the known frequency band; and
means for adjusting at least one digital to analog converter (DAC), based on a detected average power of the RF signal, to reduce effects of the mixing-product modulated image components.

29. The method of claim 10, wherein the adjusting at least one of the I and Q IF signals comprises determining an arctangent of a (D/S) where D is a difference between a parameter detected at a first setting and a parameter detected at a second setting and S is a sum of the parameter detected at the first setting and the parameter detected at the second setting.

* * * * *